US011525700B2

(12) United States Patent
Nozawa (10) Patent No.: US 11,525,700 B2
(45) Date of Patent: Dec. 13, 2022

(54) ELECTRONIC TIMEPIECE

(71) Applicant: SEIKO EPSON CORPORATION, Tokyo (JP)

(72) Inventor: Toshiyuki Nozawa, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 405 days.

(21) Appl. No.: 16/795,776

(22) Filed: Feb. 20, 2020

(65) Prior Publication Data

US 2020/0271474 A1 Aug. 27, 2020

(30) Foreign Application Priority Data

Feb. 21, 2019 (JP) .............................. JP2019-029279

(51) Int. Cl.
*G01C 25/00* (2006.01)
*G01C 9/06* (2006.01)
*G04G 21/02* (2010.01)

(52) U.S. Cl.
CPC .............. *G01C 25/00* (2013.01); *G01C 9/06* (2013.01); *G04G 21/02* (2013.01)

(58) Field of Classification Search
CPC ........... G01C 25/00; G01C 9/06; G04G 21/02
USPC ......................................................... 368/11
See application file for complete search history.

(56) References Cited

U.S. PATENT DOCUMENTS

| RE45,023 E | * | 7/2014 | Tamura | .................. | G01C 17/38 |
|---|---|---|---|---|---|
| | | | | | 33/356 |
| 2005/0256673 A1 | | 11/2005 | Hikida et al. | | |
| 2016/0084652 A1 | * | 3/2016 | Sekitsuka | .............. | G01C 17/28 |
| | | | | | 702/94 |
| 2017/0272842 A1 | * | 9/2017 | Touma | ............... | A63B 24/0003 |
| 2018/0275612 A1 | | 9/2018 | Nozawa | | |

FOREIGN PATENT DOCUMENTS

| CN | 1666086 A | 9/2005 |
|---|---|---|
| JP | H10-170662 A | 6/1998 |
| JP | 2004-279363 A | 10/2004 |
| JP | 2009-210561 A | 9/2009 |
| JP | 2014-182062 A | 9/2014 |

(Continued)

*Primary Examiner* — Aditya S Bhat
(74) *Attorney, Agent, or Firm* — Oliff PLC (57) ABSTRACT

An electronic timepiece includes a detection axis calibration unit configured to execute first calibration processing of calibrating an axial direction and second calibration processing of calibrating a direction along a third detection axis, the second calibrating processing being executed after first calibration processing, a mode setting unit configured to set a first measurement mode when second calibration processing is not completed after completion of the first calibration processing, and set a second measurement mode when the second calibration processing is completed, a first azimuth calculation unit configured to calculate an azimuth, based on detected values of a three-axis magnetic sensor in two axial directions, when the first measurement mode is set, and a second azimuth calculation unit configured to calculate an azimuth, based on detected values of the three-axis magnetic sensor in three axial directions and a detected value of a inclination sensor, when the second measurement mode is set.

8 Claims, 8 Drawing Sheets

(56) References Cited

FOREIGN PATENT DOCUMENTS

| | | |
|---|---|---|
| JP | 2017-058216 A | 3/2017 |
| JP | 2017-166895 A | 9/2017 |
| JP | 2018-059790 A | 4/2018 |
| JP | 2018-159677 A | 10/2018 |
| WO | 2004/083780 A1 | 9/2004 |
| WO | 2020/043476 A1 | 3/2020 |

* cited by examiner

ELECTRONIC TIMEPIECE

The present application is based on, and claims priority from JP Application Serial Number 2019-029279, filed Feb. 21, 2019, the disclosure of which is hereby incorporated by reference herein in its entirety.

BACKGROUND

1. Technical Field

The present disclosure relates to an electronic timepiece.

2. Related Art

JP-A-2018-159677 discloses an electronic timepiece provided with a compass function for measuring a north azimuth by detecting geomagnetism using a three-axis magnetic sensor.

In the electronic timepiece of JP-A-2018-159677, components and housing made of metal may be magnetized by exposure to an abnormal magnetic field. In this case, the magnetic sensor may detect, in addition to geomagnetism, an offset magnetic field produced by the components and housing, and thus the north azimuth cannot be accurately measured. As a result, the north azimuth is calculated by acquiring the offset magnetic field by a calibration operation and removing the offset magnetic field from the measured value of the magnetic sensor.

At this time, in the electronic timepiece of JP-A-2018-159677, because the electronic timepiece is typically used with a display surface set substantially horizontal, it is possible to calculate the north azimuth as long as a horizontal component of the geomagnetism can be calculated. Thus, in the calibration operation, the electronic timepiece is configured to acquire the horizontal component of the offset magnetic field. Specifically, in the calibration operation, the magnetic sensor is actuated to perform a first magnetism measurement, and subsequently the electronic timepiece is rotated by 180° in a horizontal direction to perform a second magnetism measurement. Then, an average value of the first measurement value and the second measurement value is calculated, and the horizontal component of the offset magnetic field is acquired. Thus, the electronic timepiece is configured to be capable of calculating the horizontal component of geomagnetism by removing the horizontal component of the offset magnetic field from a detected value of the magnetic sensor in the horizontal direction.

However, in the electronic timepiece of JP-A-2018-159677, the problem arises that the north azimuth cannot be accurately calculated when the display surface is inclined relative to the horizontal plane. Therefore, in an electronic timepiece such as JP-A-2018-159677, an acceleration sensor configured to detect an inclination of the display surface is further provided, and a technique is developed that makes it possible to calibrate the inclination of the display surface relative to the horizontal plane by means of a detected value in a vertical direction of the magnetic sensor and a detected value of the acceleration sensor.

However, when a technique such as described above is applied to the electronic timepiece of JP-A-2018-159677, a vertical component of geomagnetism needs to be calculated and thus, in addition to acquiring the offset magnetic field in the horizontal direction, the offset magnetic field in the vertical direction needs to be acquired. In this case, the user needs to perform a calibration operation of performing an operation that changes the electronic timepiece to a specific posture, such as rotating the electronic timepiece by 180° in the horizontal direction and subsequently rotating the electronic timepiece by 180° in the vertical direction, for example, to acquire the offset magnetic fields in the horizontal direction and the vertical direction. A compass configured to correct the inclination of the display surface in this way is problematic in that the calibration operation is complex and burdensome for the user. Further, the problem arises that, when the calibration operation fails, the calibration operation must be repeated from the beginning.

SUMMARY

An electronic timepiece according to the present disclosure includes a case main body including a display surface, a three-axis magnetic sensor including a first detection axis and a second detection axis, which are disposed in a plane parallel with the display surface and orthogonal to each other, and a third detection axis orthogonal to the plane, an inclination sensor configured to detect an inclination of the case main body, a detection axis calibration unit configured to execute first calibration processing of calibrating two axial directions of a direction along the first detection axis and a direction along the second detection axis, and second calibration processing of calibrating a direction along the third detection axis, the second calibration processing being executed after the first calibration processing, a mode setting unit configured to set a measurement mode to a first measurement mode when the second calibration processing is not completed after completion of the first calibration processing, and set the measurement mode to a second measurement mode when the second calibration processing is completed, a first azimuth calculation unit configured to execute first azimuth calculation processing of calculating an azimuth, based on detected values of the three-axis magnetic sensor in the two axial directions, when the first measurement mode is set by the mode setting unit, and a second azimuth calculation unit configured to execute second azimuth calculation processing of calculating an azimuth, based on detected values of the three-axis magnetic sensor in three axial directions of the direction along the first detection axis, the direction along the second detection axis, and the direction along the third detection axis, and a detected value of the inclination sensor, when the second measurement mode is set by the mode setting unit.

The electronic timepiece according to the present disclosure may include a mode display unit configured to display the measurement mode set by the mode setting unit.

In the electronic timepiece according to the present disclosure, the first azimuth calculation unit may include a notification unit configured to actuate the inclination sensor in the first azimuth calculation processing and, when the inclination sensor detects an inclination exceeding a threshold value in the first azimuth calculation processing, provides notification.

The electronic timepiece according to the present disclosure may include a hand indicating an azimuth calculated by the first azimuth calculation unit or the second azimuth calculation unit.

DESCRIPTION OF EXEMPLARY EMBODIMENTS

First Exemplary Embodiment

An electronic timepiece 1 according to a first exemplary embodiment of the present disclosure is described below with reference to the drawings.

Figure 1:
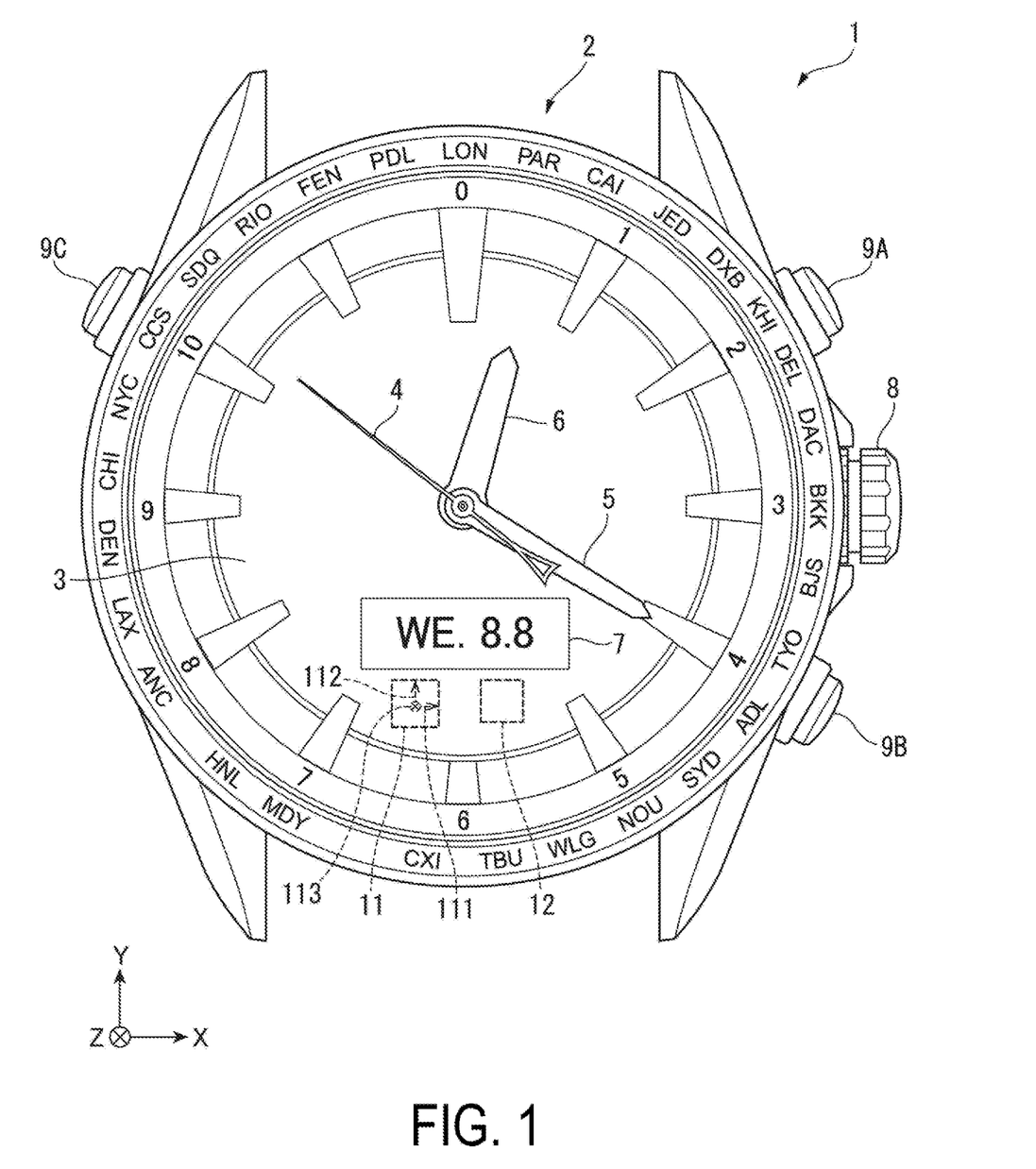
FIG. 1 is a front view illustrating an electronic timepiece according to a first exemplary embodiment.

FIG. 1 is a front view illustrating the electronic timepiece 1 according to the present exemplary embodiment.

As illustrated in FIG. 1, the electronic timepiece 1 includes a case main body 2, a dial 3, a seconds hand 4, a minute hand 5, an hour hand 6, and a liquid crystal display unit 7.

Further, the case main body 2 is provided with a crown 8, an A button 9A, a B button 9B, and a C button 9C. Note that the case main body 2 is an example of a case of the present disclosure.

The dial 3 is formed into a disc shape. Three rotary shafts are provided in a planar center of the dial 3, and the seconds hand 4, the minute hand 5, and the hour hand 6 are respectively attached to the rotating shafts. Note that a surface of the dial 3 is an example of a display surface of the present disclosure.

The hands 4 to 6 normally display time. However, when the B button 9B is pressed and a compass mode is set, the seconds hand 4 functions as an azimuth hand that displays a north azimuth. That is, the seconds hand 4 is an example of a hand of the present disclosure.

The liquid crystal display unit 7 displays various information. The liquid crystal display unit 7 normally displays a date and a day of week. Details of information displayed by the liquid crystal display unit 7 will be described later.

Further, a movement (not illustrated) is housed in the case main body 2. Then, a three-axis magnetic sensor 11 is provided to the movement. The three-axis magnetic sensor 11 is disposed between a 6 o'clock graduation and a 7 o'clock graduation in plan view from a surface of the electronic timepiece 1.

The three-axis magnetic sensor 11 is a three-axis type magnetic sensor, and measures a magnetism to acquire a detected value.

Further, the three-axis magnetic sensor 11 includes a first detection axis 111 extending in an X direction and a second detection axis 112 extending in a Y direction orthogonal to the X direction in FIG. 1. That is, the first detection axis 111 and the second detection axis 112 are orthogonal and disposed in a plane parallel to the dial 3. Thus, the three-axis magnetic sensor 11 is configured to be capable of measuring a horizontal component of geomagnetism.

Furthermore, the three-axis magnetic sensor 11 includes a third detection axis 113 extending in a Z direction orthogonal to the X direction and the Y direction. That is, the third detection axis 113 is orthogonal to the first detection axis 111 and the second detection axis 112. Thus, the three-axis magnetic sensor 11 is configured to be capable of measuring the geomagnetism of a vertical component in addition to the horizontal component.

Note that, as illustrated in FIG. 1, the X direction refers to a direction from a 9 o'clock graduation toward a 3 o'clock graduation of the dial 3, and the Y direction refers to a direction from the 6 o'clock graduation toward a 12 o'clock graduation. Further, a Z-axis direction is a direction from the dial 3 toward a case back along the rotary shafts of the hands 4 to 6.

Here, "the first detection axis 111 and the second detection axis 112 are orthogonal" is not limited to the first detection axis 111 and the second detection axis 112 being completely orthogonal, and includes, for example, an angle of intersection between the first detection axis 111 and the second detection axis 112 being offset from 90° by a few degrees.

Further, "the third detection axis 113 is orthogonal to the first detection axis 111 and the second detection axis 112" is not limited to the third detection axis 113 being completely orthogonal, and includes, for example, an angle of intersection between the third detection axis 113 and the first detection axis 111 being offset from 90° by a few degrees. Similarly, this also includes the angle of intersection between the third detection axis 113 and the second detection axis 112 being offset from 90° by a few degrees.

This means that influences such as an assembly accuracy of the axes of the three-axis magnetic sensor 11 are permitted.

Furthermore, "the first detection axis 111 and the second detection axis 112 are disposed in a plane parallel with the dial 3" is not limited to the first detection shaft 111 and the second detection axis 112 being disposed in a plane completely parallel with the dial 3, and includes, for example, an angle of intersection between a plane parallel with the dial 3 and the first detection axis 111 being a few degrees due to influences such as an assembly accuracy of the movement. Similarly, this also includes the angle of intersection between a plane parallel with the dial 3 and the second detection axis 111 being a few degrees.

Further, an acceleration sensor 12 is provided to the movement (not illustrated) described above. The acceleration sensor 12 is disposed between a 5 o'clock graduation and the 6 o'clock graduation in plan view from the surface of the electronic timepiece 1.

The acceleration sensor 12 is a three-axis type acceleration sensor, and is configured to be capable of detecting a gravitational acceleration in the X-axis direction, the Y-axis direction, and the Z-axis direction illustrated in FIG. 1.

In the present exemplary embodiment, as described later, the acceleration sensor 12 is used to separate a magnetism measurement by the three-axis magnetic sensor 11 into the horizontal component and the vertical component. Further, the acceleration sensor 12 is configured to be capable of detecting an inclination of the case main body 2 from an orientation of gravitational acceleration. That is, the acceleration sensor 12 is an example of an inclination sensor of the present disclosure.

Schematic Configuration of Electronic Timepiece

Figure 2:
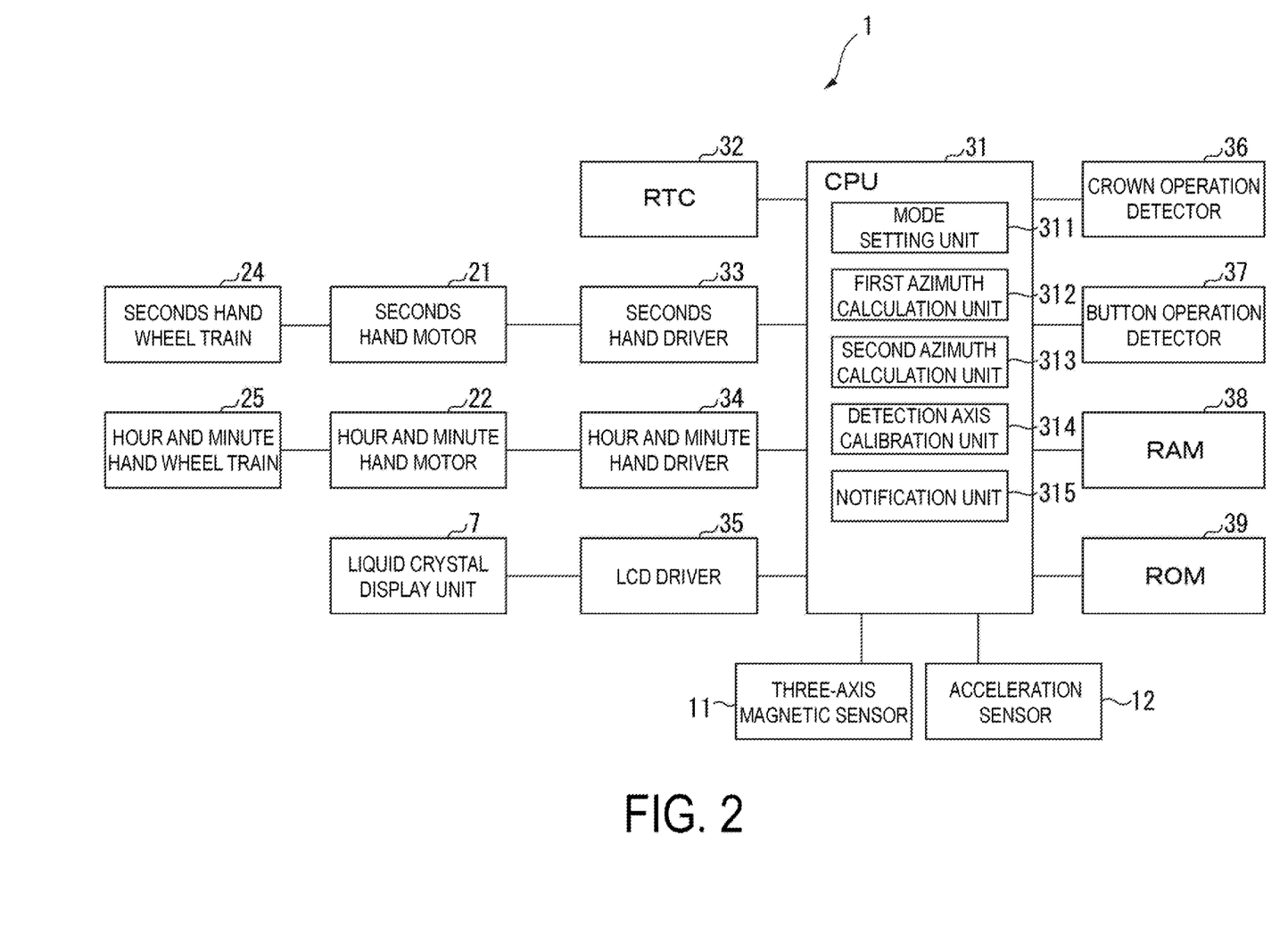
FIG. 2 is a block diagram illustrating a schematic configuration of the electronic timepiece according to the first exemplary embodiment.

FIG. 2 is a block diagram illustrating a schematic configuration of the electronic timepiece 1.

As illustrated in FIG. 2, the electronic timepiece 1 includes the three-axis magnetic sensor 11, the acceleration sensor 12, a seconds hand motor 21, an hour and minute hand motor 22, the liquid crystal display unit 7, a seconds hand wheel train 24, and an hour and minute hand wheel train 25. Furthermore, the electronic timepiece 1 includes a CPU 31, an RTC 32, a seconds hand driver 33, an hour and minute hand driver 34, a liquid crystal display (LCD) driver 35, a crown operation detector 36, a button operation detector 37, a RAM 38, and a ROM 39.

Note that CPU is an abbreviation for "central processing unit", RTC is an abbreviation for "real-time clock", RAM is an abbreviation for "random access memory", and ROM is an abbreviation for "read only memory".

The seconds hand motor 21 and the minute hand motor 22 are constituted by, for example, a bipolar stepper motor.

The seconds hand wheel train 24 is constituted by a plurality of toothed gears, and moves the seconds hand 4 in conjunction with a rotor (not illustrated) of the seconds hand motor 21.

The hour and minute hand wheel train 25 is constituted by a plurality of toothed gears, and moves the minute hand 5 and the hour hand 6 in conjunction with a rotor (not illustrated) of the hour and minute hand motor 22.

The seconds hand driver 33 and the hour and minute hand driver 34 output motor drive currents to respective corresponding motors in response to signals from the CPU 31.

The LCD driver 35 outputs a drive signal to the liquid crystal display unit 7.

The crown operation detector 36 detects operation of the crown 8 and outputs an operation signal corresponding to the operation to the CPU 31.

The button operation detector 37 detects operation of the A button 9A and the B button 9B, and outputs an operation signal corresponding to the operation to the CPU 31.

The ROM 39 stores programs and the like executed by the CPU 31.

The RAM 38 stores data and the like required by the CPU to execute processing. For example, the RAM 38 stores a magnetic offset value indicating an offset magnetic field occurring inside the timepiece.

The CPU 31 executes a program stored in the ROM 39, and thus functions as a mode setting unit 311, a first azimuth calculation unit 312, a second azimuth calculation unit 313, a detection axis calibration unit 314, and a notification unit 315.

Mode Setting Unit

The mode setting unit 311, in accordance with operation of the crown 8, the A button 9A, and the B button 9B, sets a normal mode for displaying the time, a compass mode for measuring and displaying the azimuth, and a calibration mode for acquiring the magnetic offset value described above.

In the present exemplary embodiment, for example, when the B button 9B is pressed while the normal mode is set, the mode setting unit 311 sets the mode to the compass mode. Further, when the B button 9B is pressed while the compass mode is set, the mode setting unit 311 releases the compass mode. That is, the mode setting unit 311 sets the mode to the normal mode. Furthermore, when the crown 8 is pulled one stage while the compass mode is set, the mode setting unit 311 sets the mode to calibration mode.

Further, in the present exemplary embodiment, the mode setting unit 311 sets a first measurement mode or a second measurement mode as the compass mode in accordance with calibration processing by the detection axis calibration unit 314. Note that details of the first measurement mode and the second measurement mode will be described later.

First Azimuth Calculation Unit

When the first measurement mode is set as the compass mode by the mode setting unit 311, the first azimuth calculation unit 312 executes first azimuth calculation processing of calculating the azimuth on the basis of a detected value of the first detection axis 111 and a detected value of the second detection axis 112 of the three-axis magnetic sensor 11.

Note that details of the first azimuth calculation processing by the first azimuth calculation unit 312 will be described later.

Second Azimuth Calculation Unit

When the second measurement mode is set as the compass mode by the mode setting unit 311, the second azimuth calculation unit 313 executes second azimuth calculation processing of calculating the azimuth on the basis of a detected value of the first detection axis 111 and a detected value of the second detection axis 112, and a detected value of the second detection axis 113 of the three-axis magnetic sensor 11. Note that details of the second azimuth calculation processing by the second azimuth calculation unit 313 will be described later.

Detection Axis Calibration Unit

When calibration mode is set, the detection axis calibration unit 314 executes calibration processing of calculating and acquiring the magnetic offset value by controlling the three-axis magnetic sensor 11 to measure magnetism. Details of the calibration processing by the detection axis calibration unit 314 will be described later.

Notification Unit

In the first azimuth calculation processing, the notification unit 315 executes notification processing of providing a notification when the acceleration sensor 12 detects an inclination exceeding a threshold value. Details of the notification processing by the notification unit 315 will be described later.

Calibration Processing

Figure 3:
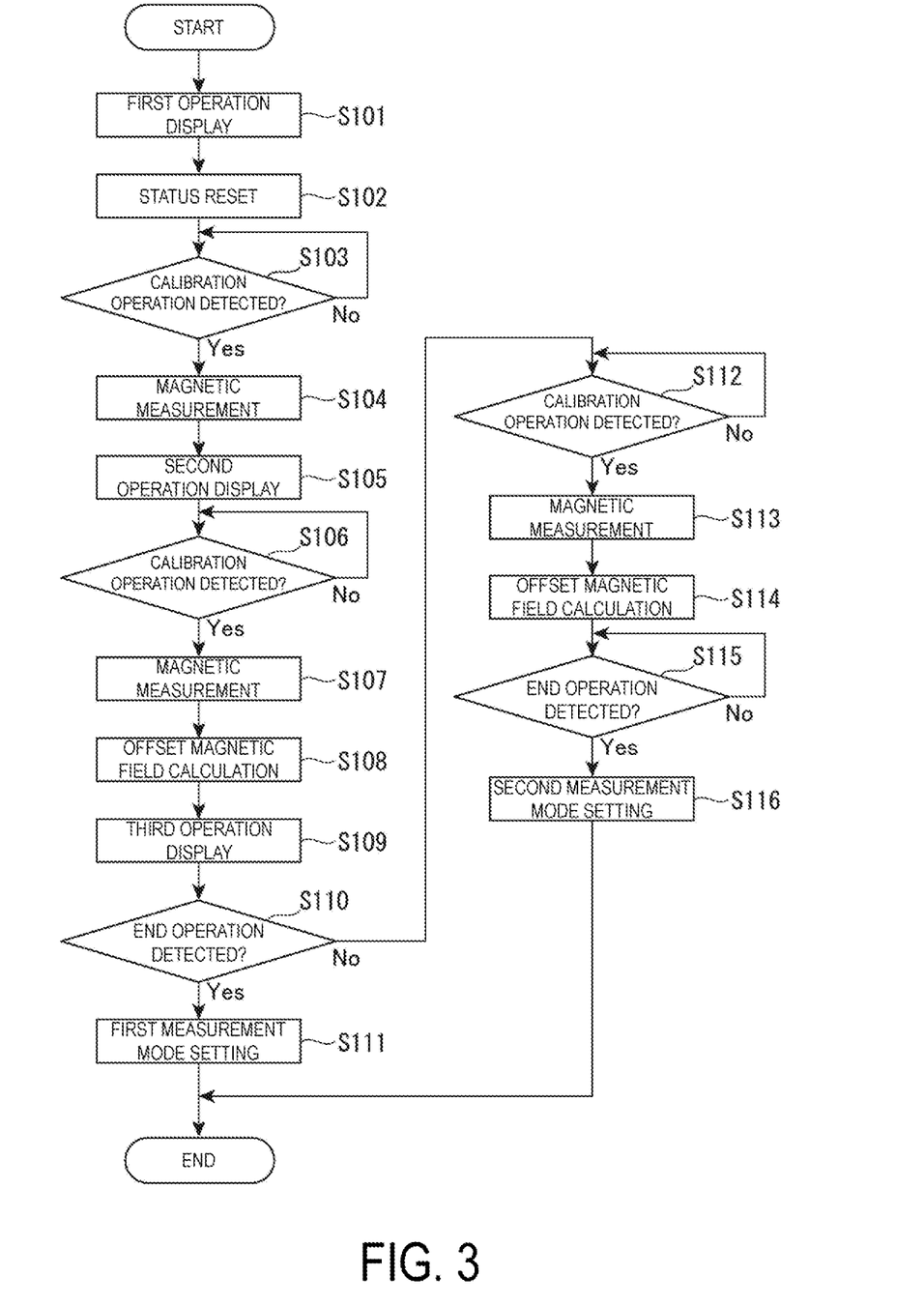
FIG. 3 is a flowchart illustrating calibration processing according to the first exemplary embodiment.

Next, the calibration processing will be described on the basis of the flowchart of FIG. 3.

In the present exemplary embodiment, when the crown 8 is pulled one stage while compass mode is set, the detection axis calibration unit 314 executes first calibration processing or second calibration processing as the calibration processing.

As step S101, the detection axis calibration unit 314 executes a first operation display prompting an operation according to a first posture. Specifically, the detection axis calibration unit 314 moves the seconds hand 4, which is the azimuth hand, to a position indicating 12 o'clock, and causes the liquid crystal display unit 7 to display the string "CAL1 ↑".

Note that the first posture is a posture in which the user, while keeping the electronic timepiece 1 horizontal, orientates the 6 o'clock position in the direction of him- or herself.

Next, as step S102, the detection axis calibration unit 314 resets the status of calibration. This causes the calibration status to be "unset".

Next, as step S103, the detection axis calibration unit 314 determines whether or not a calibration operation has been detected. Specifically, whether or not the B button 9B was pressed by the user is determined. Note that, at this time, the user operates the B button 9B while keeping the electronic timepiece 1 horizontal.

When NO is determined in step S103, the detection axis calibration unit 314 repeats step S103 until YES is determined in step S103, that is, until the B button 9B is pressed by the user.

When YES is determined in step S103, the detection axis calibration unit 314, as step S104, executes magnetism measurement. Specifically, the detection axis calibration unit 314 operates the three-axis magnetic sensor 11 to acquire a first detected value "Bx1, By1, Bz1" in directions along the first detection axis 111, the second detection axis 112, and the third detection axis 113.

Next, as step S105, the detection axis calibration unit 314 executes a second operation display prompting an operation according to a second posture. Specifically, the detection axis calibration unit 314 moves the seconds hand 4 to a position indicating 6 o'clock, and causes the liquid crystal display unit 7 to display the string "CAL2 ↓". Note that the second operation display described above is a display prompting the user to rotate the electronic timepiece 1 by 180° while keeping the electronic timepiece 1 horizontal.

Further, the second posture is a posture in which the user, while keeping the electronic timepiece 1 horizontal, orientates the 12 o'clock position in the direction of him- or herself.

Then, as step S106, the detection axis calibration unit 314 determines whether or not a calibration operation has been detected, that is, whether or not the B button 9B has been pressed by the user.

When NO is determined in step S106, the detection axis calibration unit 314 repeats step S106 until YES is determined in step S106, that is, until the B button 9B is pressed by the user.

When YES is determined in step S106, the detection axis calibration unit 314, as step S107, executes magnetism measurement. Specifically, the detection axis calibration unit 314 operates the three-axis magnetic sensor 11 to acquire a second detected value "Bx2, By2, Bz2" in directions along the first detection axis 111, the second detection axis 112, and the third detection axis 113.

Next, as step S108, the detection axis calibration unit 314 calculates magnetic offset values "$Bx_{off}$, $By_{off}$", which are offset magnetic fields. Specifically, the detection axis calibration unit 314 calculates $Bx_{off}$, which is the magnetic offset value in the X-axis direction, that is, in the first detection axis 111 direction, from the calculation formula (Bx1+Bx2)/2. Further, the detection axis calibration unit 314 calculates $By_{off}$, which is the magnetic offset value in the Y-axis direction, that is, in the second detection axis 112 direction, from the calculation formula (By1+By2)/2.

Next, as step S109, the detection axis calibration unit 314 executes a third operation display prompting an operation according to a third posture. Specifically, the detection axis calibration unit 314 moves the seconds hand 4 to a position indicating 9 o'clock, and causes the liquid crystal display unit 7 to display the string "CRL3 FD". Note that FD is an abbreviation for face down.

Further, the third posture is a posture in which the electronic timepiece 1 is rotated by 180° from the second posture so that the dial 3 is facing downward.

Next, as step S110, the detection axis calibration unit 314 determines whether or not an end operation has been detected. Specifically, the detection axis calibration unit 314 determines whether or not the crown 8 has been returned to a stage 0 position.

When the detection axis calibration unit 314 determines YES in step S110, in other words, when it is determined that the crown 8 has been returned to the stage 0 position and thus the end operation has been detected, the mode setting unit 311, as step S111, sets the measurement mode of compass mode to the first measurement mode. Then, the magnetic offset value "$Bx_{off}$, $By_{off}$" in the two axial directions is stored in the RAM 38, and the calibration processing is ended.

In this way, the detection axis calibration unit 314 acquires the magnetic offset value "$Bx_{off}$, $By_{off}$" in the two axial directions by steps S101 to S111. Note that steps S101 to S111 are an example of a first calibration processing of the present disclosure.

Further, when the end operation has been detected midway through the first calibration processing, that is, when the crown 8 has been returned to the stage 0 position, the calibration processing is canceled. In this case, the original calibration data is maintained.

When the detection axis calibration unit 314 determines NO in step S110, the detection axis calibration unit 314, as step S112, determines whether or not a calibration operation has been detected, that is, whether or not the B button 9B has been pressed by the user.

When NO is determined in step S112, the detection axis calibration unit 314 repeats step S112 until YES is determined in step S112, that is, until the B button 9B is pressed by the user.

When YES is determined in step S112, the detection axis calibration unit 314, as step S113, executes magnetism measurement. Specifically, the detection axis calibration unit 314 operates the three-axis magnetic sensor 11 to acquire a third detected value "Bx3, By3, Bz3" in directions along the first detection axis 111, the second detection axis 112, and the third detection axis 113.

Next, as step S114, the detection axis calibration unit 314 calculates the magnetic offset value "$Bz_{off}$", which is an offset magnetic field. Specifically, the detection axis calibration unit 314 calculates $Bz_{off}$, which is the magnetic offset value in the Z-axis direction, that is, in the third detection axis 113 direction, from the calculation formula (Bz2+Bz3)/2.

Then, as step S115, the detection axis calibration unit 314 determines whether or not an end operation has been detected, that is, whether or not the crown 8 has been returned to the stage 0 position.

When NO is determined in step S115, the detection axis calibration unit 314 repeats step S115 until YES is determined in step S115, that is, until the crown 8 has been returned to the 0 stage position.

When YES is determined in step S115, the mode setting unit 311, as step S116, sets the measurement mode of compass mode to the second measurement mode. Then, the magnetic offset values "$Bx_{off}$, $By_{off}$, $Bz_{off}$" in the three axial directions are stored in the RAM 38, and the calibration processing is ended.

In this way, the detection axis calibration unit 314 acquires the magnetic offset value "$Bz_{off}$" in the Z-axis direction by steps S112 to S116. Note that steps S112 to S116 are an example of a second calibration processing of the present disclosure.

First Azimuth Calculation Processing

Next, the first azimuth calculation processing will be described.

Figure 4:
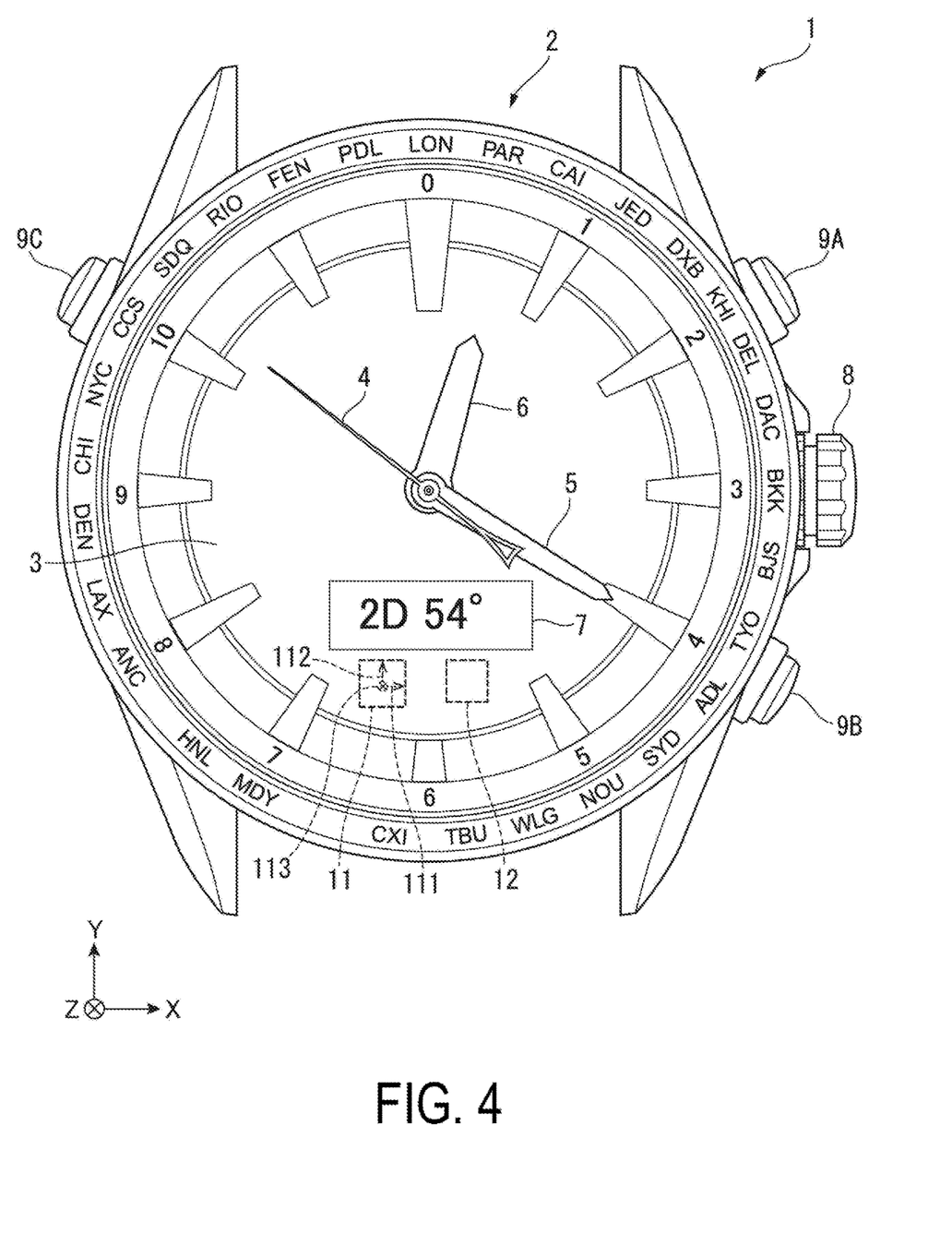
FIG. 4 is a front view illustrating the electronic timepiece when first azimuth calculation processing is executed.

FIG. 4 is a front view of the electronic timepiece 1 when the first azimuth calculation processing is executed.

As described above, when the measurement mode of compass mode is set to the first measurement mode by the mode setting unit 311, the first azimuth calculation unit 312 executes the first azimuth calculation processing.

As illustrated in FIG. 4, in the first azimuth calculation processing, the first azimuth calculation unit 312 causes the liquid crystal display unit 7 to display the string "2D". This allows the user to identify that the compass mode is set to the first measurement mode. Note that the liquid crystal display unit 7 is an example of a mode display unit of the present disclosure.

Next, the first azimuth calculation unit 312 actuates the three-axis magnetic sensor 11 to measure the magnetism and acquire the detected values. Specifically, the first detection axis 111 direction of the three-axis magnetic sensor 11, that is, "$Bx_{RAW}$", which is a detected value in the X-axis direction illustrated in FIG. 1, and "$By_{RAW}$", which is a detected value in the second detection axis 112 direction, that is, in the Y-axis direction, are acquired.

Next, the first azimuth calculation unit 312 reads the magnetic offset value from the RAM 38, and corrects the detected values of the three-axis magnetic sensor 11 on the basis of the magnetic offset value. Specifically, a value "Bx, By" after offset calibration is acquired by subtracting the aforementioned magnetic offset values "$Bx_{off}$, $By_{off}$" in the two axial directions from the detected values "$Bx_{RAW}$, $By_{RAW}$".

Then, the first azimuth calculation unit 312 calculates the north azimuth from the value "Bx, By" after the offset calibration, and causes the seconds hand 4 to indicate the north azimuth, as illustrated in FIG. 4.

Further, the first azimuth calculation unit 312 calculates an azimuth angle clockwise in the 12 o'clock direction with respect to the north azimuth, and causes the liquid crystal display unit 7 to display the angle.

Furthermore, the first azimuth calculation unit 312, in the first azimuth calculation processing, actuates the acceleration sensor 12 to detect the inclination of the case main body 2. Then, the first azimuth calculation unit 312 determines whether or not the detected value detected by the acceleration sensor 12 exceeds a preset threshold value, and, when the detected value is determined to exceed the threshold value, the notification unit 315 causes the liquid crystal display unit 7 to display the string "LEVEL". That is, the notification unit 315 provides a notification that the case main body 2 is inclined beyond the predetermined threshold. This allows the user to identify that the case main body 2 is inclined beyond the predetermined threshold value, and thus keep the electronic timepiece 1 horizontal and acquire a highly accurate azimuth.

Second Azimuth Calculation Processing

Next, the second azimuth calculation processing will be described.

Figure 5:
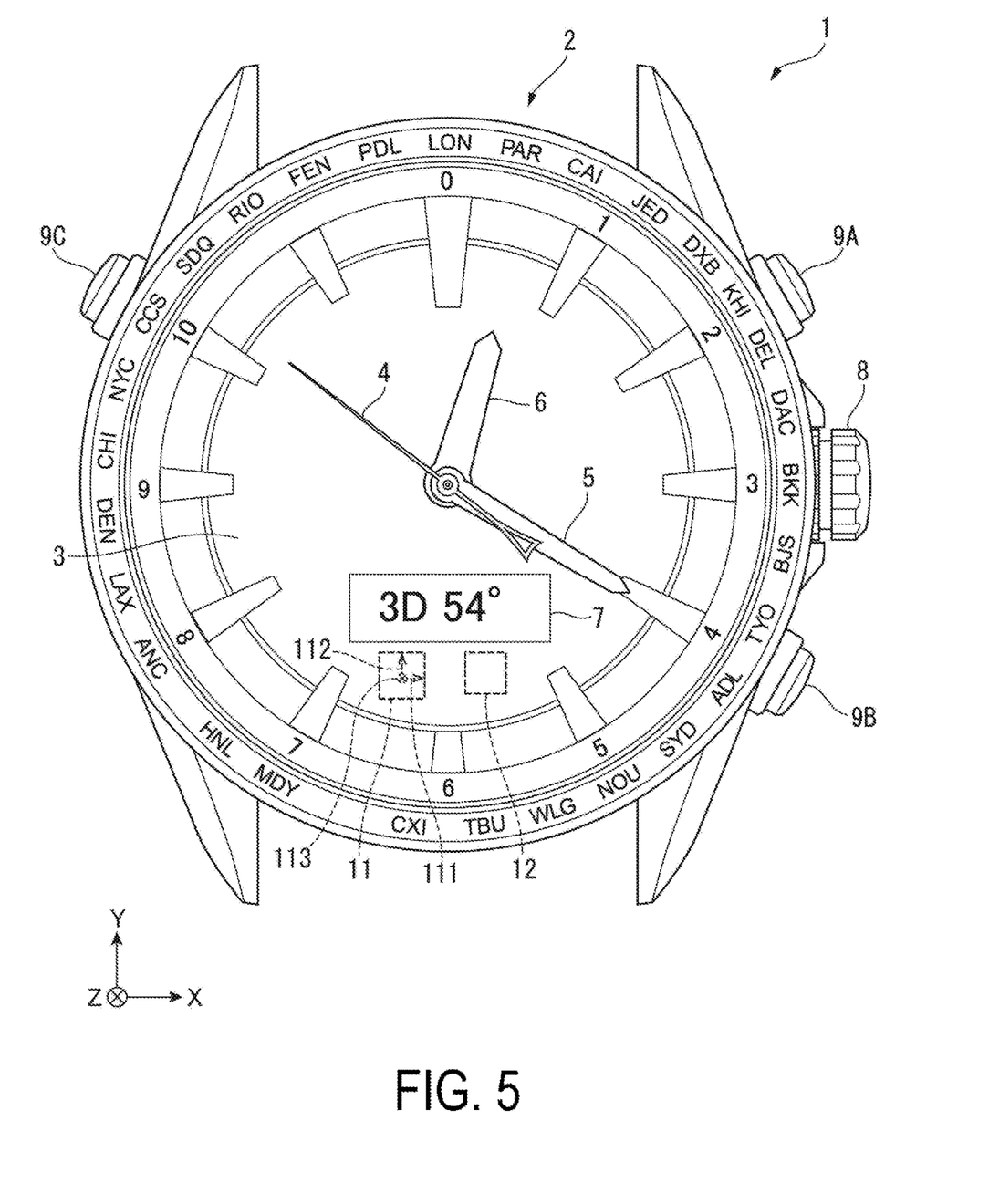
FIG. 5 is a front view illustrating the electronic timepiece when second azimuth calculation processing is executed.

FIG. 5 is a front view of the electronic timepiece 1 when the second azimuth calculation processing is executed.

As described above, when the measurement mode of compass mode is set to the second measurement mode by the mode setting unit 311, the second azimuth calculation unit 312 executes the second azimuth calculation processing.

As illustrated in FIG. 5, in the second azimuth calculation processing, the second azimuth calculation unit 313 causes the liquid crystal display unit 7 to display the string "3D". This allows the user to identify that the compass mode is set to the second measurement mode.

Next, the first azimuth calculation unit 312 actuates the three-axis magnetic sensor 11 to measure the magnetism and acquire the detected value. Specifically, the detected value "$Bx_{RAW}$, $By_{RAW}$, $Bz_{RAW}$" in the three axial directions of the first detection axis 111, the second detection axis 112, and the third detection axis 113 of the three-axis magnetic sensor 11 is acquired.

Next, the second azimuth calculation unit 313 reads the magnetic offset value from the RAM 38, and corrects the detected value of the three-axis magnetic sensor 11 on the basis of the magnetic offset value. Specifically, a value "Bx, By, Bz" after offset calibration are acquired by subtracting the magnetic offset value "$Bx_{off}$, $By_{off}$, $Bz_{off}$" in the three-axis direction described above from the detected value "$Bx_{RAW}$, $By_{RAW}$, $Bz_{RAW}$".

Then, the second azimuth calculation unit 313 separates the above-described value "$B_X$, $B_Y$, $B_Z$" into the horizontal component "$B_{HX}$, $B_{HY}$" and the vertical component "$B_{VZ}$" based on the detected value of the acceleration sensor 12. Note that, while the method of using the detected value of the acceleration to separate the horizontal component of the detected value of the three-axis magnetic sensor 11 is a known technique and thus a detailed description thereof is omitted, the horizontal component can be separated by, for example, multiplying the detected value of the three-axis magnetic sensor 11 corrected by the magnetic offset value by a rotation matrix based on a measured value of the acceleration sensor 12.

Then, the second azimuth calculation unit 312 calculates the north azimuth from the separated horizontal component "$B_{HX}$, $B_{HY}$", and causes the seconds hand 4 to indicate the north azimuth, as illustrated in FIG. 5. This makes it possible to perform the azimuth measurement on the basis of the magnetism measurement in the three axial directions and separate the horizontal component from the result. Thus, even when the user does not keep the electronic timepiece 1 horizontal, for example, the azimuth can be accurately calculated.

Further, the second azimuth calculation unit 313 calculates the azimuth angle clockwise in the 12 o'clock direction with respect to the north azimuth, and causes the liquid crystal display unit 7 to display the angle.

Advantageous Effects of First Exemplary Embodiment

According to the present exemplary embodiment, the following advantageous effects can be produced.

In the present exemplary embodiment, the electronic timepiece 1 includes the detection axis calibration unit 314 configured to be capable of executing the first calibration processing of calibrating the two axial directions of the direction along the first detection axis 111 and the direction along the second detection axis 112, and the second calibration processing of calibrating the direction along the third detection axis 113, with the second calibration being executed after the first calibration processing. Further, the electronic timepiece 1 includes the mode setting unit 311 configured to set the measurement mode to the first measurement mode when the second calibration process is not completed after completion of the first calibration processing by the detection axis calibration unit 314, and set the measurement mode to the second measurement mode when the second calibration processing has been completed. Furthermore, the electronic timepiece 1 includes the first azimuth calculation unit 312 configured to calculate the azimuth on the basis of the detected value of the three-axis magnetic sensor 11 in the two axial directions when the first measurement mode is set, and the second azimuth calculation unit 313 configured to calculate the azimuth on the basis of the detected value of the three-axis magnetic sensor 11 in the three axial directions and the detected value of the acceleration sensor 12 when the second measurement mode is set.

This allows the user to use the three-axis magnetic sensor 11 as a magnetic sensor that detects the magnetism in the two axial directions when the calibration processing has ended after execution of the first calibration processing. Therefore, compared to when the calibration processing is performed for all three axes, the operation for calibration can be easily executed.

Further, this allows the user to use the three-axis magnetic sensor 11 as a magnetic sensor that detects the magnetism in the three axial directions when the second calibration processing has been executed. Therefore, because inclination compensation of the detected value of the three-axis magnetic sensor 11 can be performed using the detected value of the acceleration sensor 12, the user can acquire a more accurate azimuth.

In this way, the user can select between ending the calibration processing in the first calibration processing and executing the calibration processing through the second calibration processing, making it possible to improve user convenience.

In the present exemplary embodiment, the liquid crystal display unit 7 configured to display the measurement mode set by the mode setting unit 311 is provided.

This allows the user to identify the set measurement mode and thus, for example, be aware to keep the electronic timepiece 1 horizontal when the first measurement mode is set. As a result, the user can acquire a highly accurate azimuth.

In the present exemplary embodiment, the first azimuth calculation unit 312 includes the notification unit 315 that provides a notification when the acceleration sensor 12 is actuated in the first azimuth calculation processing and detects an inclination exceeding the threshold value in the first azimuth calculation processing.

This allows the user to identify that the case main body 2 is inclined beyond the predetermined threshold value, and thus keep the electronic timepiece 1 horizontal and acquire a highly accurate azimuth.

In the present exemplary embodiment, the electronic timepiece 1 includes the seconds hand 4 that indicates an azimuth calculated by the first azimuth calculation unit 312 or the second azimuth calculation unit 313.

This allows the user to easily acquire the north azimuth by identifying the direction indicated by the seconds hand 4.

Second Exemplary Embodiment

Next, a second exemplary embodiment will be described with reference to the drawing of FIG. 6.

The second exemplary embodiment differs from the first exemplary embodiment described above in that, in the calibration processing, a posture is measured and whether or not the measured posture is within an appropriate range is determined.

Note that components identical to those of the electronic timepiece 1 in the first exemplary embodiment are denoted using identical reference numerals, and detailed descriptions thereof are omitted.

Figure 6:
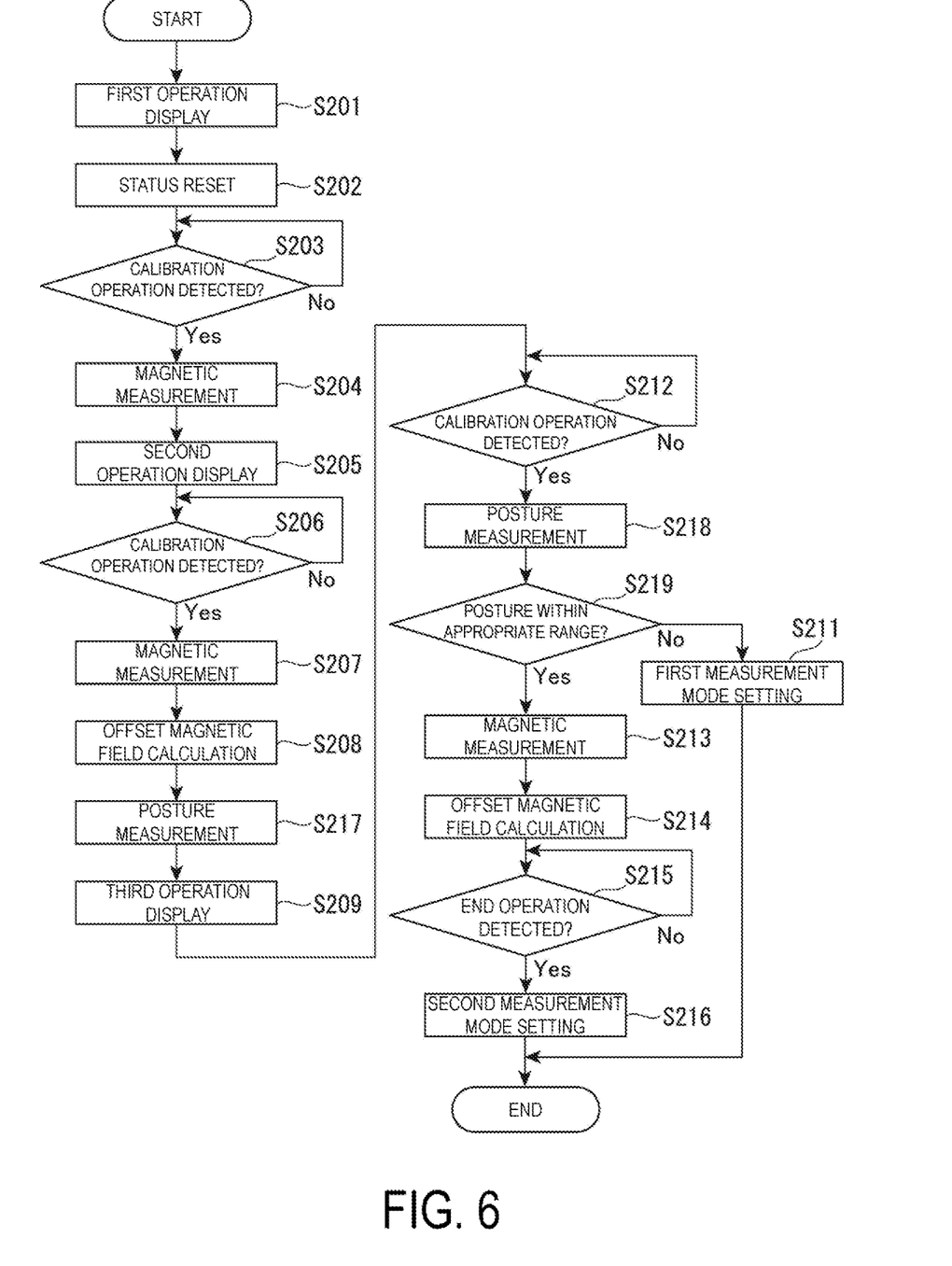
FIG. 6 is a flowchart illustrating calibration processing according to a second exemplary embodiment.

FIG. 6 is a flowchart illustrating calibration processing according to the second exemplary embodiment.

Note that in the second exemplary embodiment, steps S201 to S209 and S211 to S216 are the same as the steps S101 to S109 and S111 to S116 of the first exemplary embodiment described above, and thus descriptions thereof are omitted.

As illustrated in FIG. 6, as step S217, the detection axis calibration unit 314 executes posture measurement. Specifically, the detection axis calibration unit 314 actuates the acceleration sensor 12 to acquire an acceleration "Ax2, Ay2, Az2" in the three axial directions of the second posture.

Further, as step S218, the detection axis calibration unit 314 executes posture measurement. Specifically, the detection axis calibration unit 314 actuates the acceleration sensor 12 to acquire the acceleration "Ax3, Ay3, Az3" in the three axial directions of the third posture.

Then, as step S219, the detection axis calibration unit 314 determines whether or not the posture is within an appropriate range. Specifically, the detection axis calibration unit 314 determines whether or not the acceleration Az2 in the Z-axis direction in the second posture is $-11.8$ m/s$^2$ ($-1.2$ g)<Az2<$-7.8$ m/s$^2$ ($-0.8$ g), and the acceleration Az3 in the Z-axis direction in the third posture is 7.8 m/s$^2$ (0.8 g)<Az3<11.8 m/s$^2$ (1.2 g).

Here, in the second posture, normally the acceleration Az2 in the Z-axis direction is about $-9.8$ m/s$^2$ ($-1.0$ g). Furthermore, in the third posture, normally the acceleration Az3 in the Z-axis direction is about 9.8 m/s$^2$ (1.0 g). Therefore, when the above-described determination condition is not satisfied, it is likely that the electronic timepiece 1 is not appropriately rotated from the second posture to the third posture. In this case, in step S214, it is likely that the magnetic offset value "$Bz_{off}$" in the Z-axis direction cannot be appropriately calculated.

Therefore, when NO is determined in step S219, the detection axis calibration unit 314 determines that the second calibration processing has failed, and the mode setting unit 311 sets the first measurement mode to the measurement mode in step S211. In this case, the detection axis calibration unit 314 may cause the liquid crystal display unit 7 to display a display prompting the user to return the crown 8 to the stage 0 position.

Note that the determination condition in step S219 is not limited to the condition described above, and for example, the detection axis calibration unit 314 may be configured to determine that a polarity of the acceleration in the Z-axis direction changed between the second posture and the third posture.

Advantageous Effects of Second Exemplary Embodiment

According to the present exemplary embodiment, the following advantageous effects can be produced.

In the present exemplary embodiment, when the detection axis calibration unit 314 determines whether the accelerations Az2, Az3 in the Z-axis direction in the second posture and the third posture are within the appropriate range, and determines that the accelerations Az2, Az3 are not appropriate, the mode setting unit 311 sets the measurement mode to the first measurement mode.

As a result, because the measurement mode is set to the first measurement mode when the user unintentionally fails the third axis calibration processing, that is, the second calibration processing, the three-axis magnetic sensor 11 can be used as a magnetic sensor that detects the magnetism in the two axial directions. Therefore, even when the second calibration processing fails, the calibration processing need not be repeated from the beginning, making it possible to improve user convenience.

Modification Example

Note that the present disclosure is not limited to each of the exemplary embodiments described above, and variations, modifications, and the like within the scope in which the object of the present disclosure can be achieved are included in the present disclosure.

Figure 7:
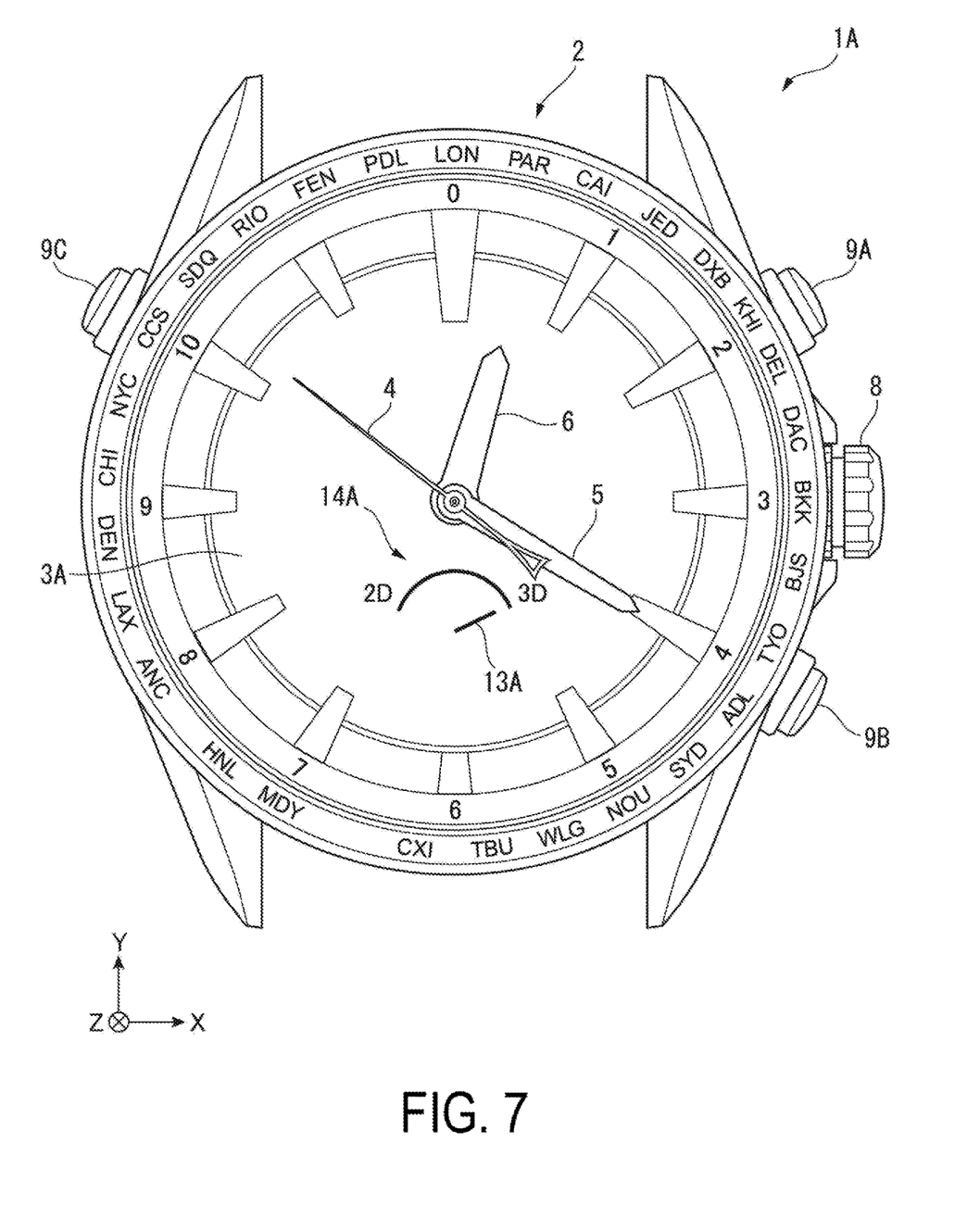
FIG. 7 is a front view illustrating an electronic timepiece according to a modification example.

FIG. 7 is a front view illustrating an electronic timepiece 1A according to a modification example.

As illustrated in FIG. 7, the electronic timepiece 1A is fitted with a mode hand 13A in a 6 o'clock direction relative to a planar center as viewed from the timepiece surface side. Further, on a dial 3A, a mode display 14A including the marks "2D" indicating the first measurement mode and "3D" indicating the second measurement mode as well as an arc is displayed.

Thus, the mode hand 13A indicates the mark "2D" or "3D" of the mode display 14A in response to the set measurement mode, making it possible for the user to identify the measurement mode.

Figure 8:
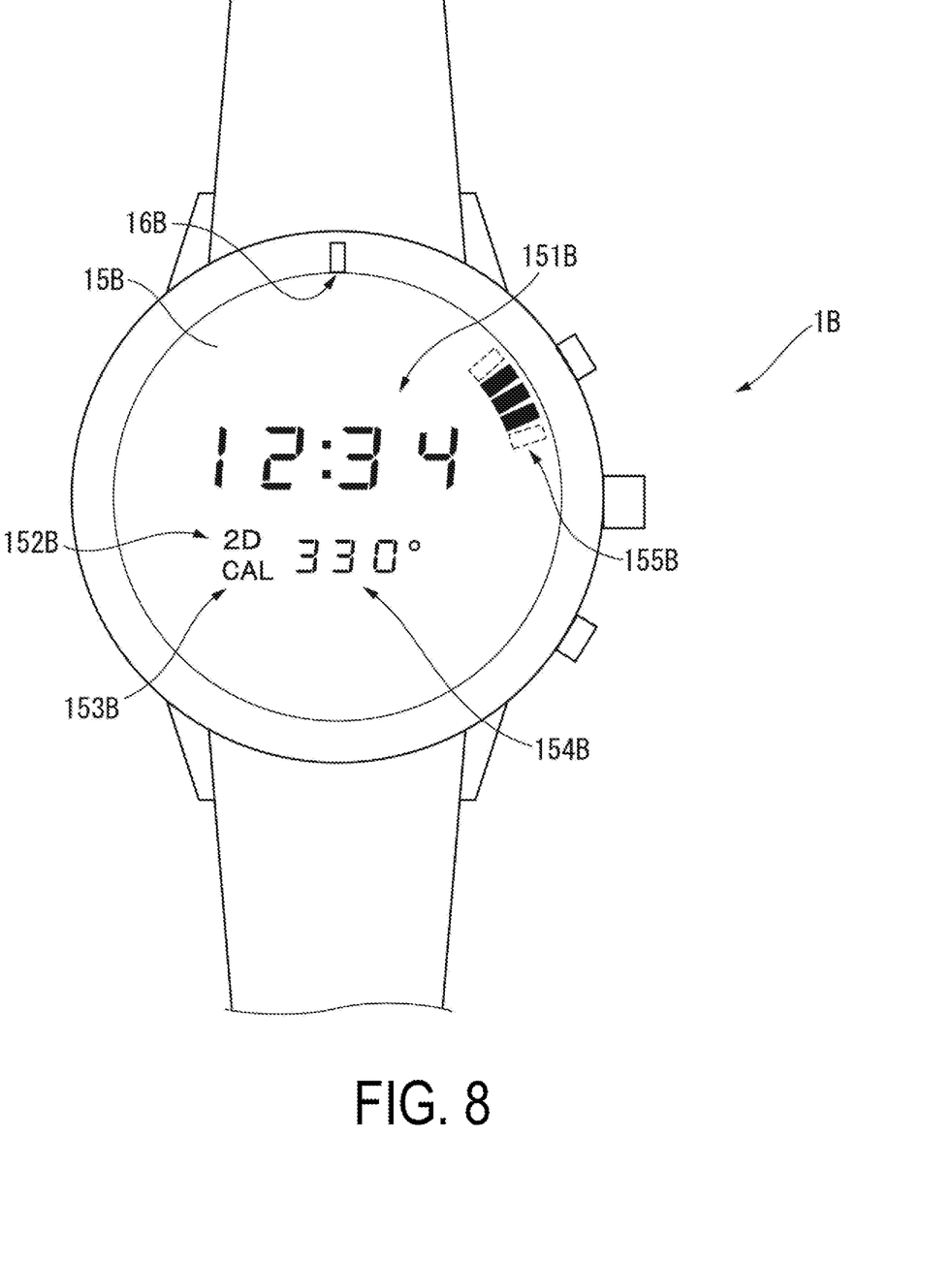
FIG. 8 is a front view illustrating an electronic timepiece according to another modification example.

Further, FIG. 8 is a front view illustrating an electronic timepiece 1B according to another modification example.

As illustrated in FIG. 8, the electronic timepiece 1B is configured as a digital timepiece. Then, a time display 151B, a measurement mode display 152B, a calibration display 153B, an azimuthal angle display 154B, and an azimuth mark 155B are displayed on a display unit 15B of the electronic timepiece 1B, and an azimuthal angle reference mark 16B is displayed on an outer periphery of the display unit 15B. Even with such an electronic timepiece 1B, the user can easily can easily identify the north azimuth, the measurement mode, and the like.

While, in the first azimuth calculation processing in the exemplary embodiments described above, when the detected value detected by the acceleration sensor 12 is determined to exceed the preset threshold value, the notification unit 315 causes the liquid crystal display unit 7 to display the string "LEVEL", the present disclosure is not limited thereto. For example, the notification unit 315 may provide a notification that the case main body 2 is inclined by a predetermined inclination or greater by causing the seconds hand 4 to reciprocate. Additionally, the notification unit 315 may be configured to be capable of providing a notification that the case main body 2 is inclined by a predetermined inclination or greater by using, for example, a sound source or a light source.

While, in the first calibration processing in the exemplary embodiments described above, the detection axis calibration unit 314 is configured to acquire the first detected value "Bx1, By1, Bz1" and the second detected value "Bx2, By2, Bz2" by performing magnetic measurement in the first posture and the second posture and thus find the magnetic offset value "$Bx_{off}$, $By_{off}$" in the two axial directions, the present disclosure is not limited thereto. For example, the detection axis calibration unit 314 may be configured to continuously acquire, in the first calibration processing, detected values in the first detection axis 111 direction and the second detection axis 112 direction while the electronic timepiece 1 is rotated about the Z axis with the electronic timepiece 1 kept horizontal, find a central value of the detected values in the first detection axis 111 direction and a central value of the detected values in the second detection axis 112 direction, and thus find the magnetic offset value "$Bx_{off}$, $By_{off}$" in the two axial directions.

While, in the second exemplary embodiment, the detection axis calibration unit 314 determines whether the second posture and the third posture are within an appropriate range, the present disclosure is not limited thereto. For example, the detection axis calibration unit 314 may determine whether the first posture and the second posture are within the appropriate range. Then, when the first posture and the second posture are not within an appropriate range, the detection axis calibration unit 314 may cancel the calibration processing. Furthermore, in this case, the notification unit 315 may provide a notification that the calibration processing has been canceled.

While, in the exemplary embodiments described above, the electronic timepiece 1 is configured to be capable of displaying the north azimuth as magnetic north, the present disclosure is not limited thereto. For example, the electronic timepiece 1 may be configured to be capable of acquiring an declination angle of a current location and calculating and displaying the azimuth of true north by correcting a calculated north azimuth at the declination angle.

While, in the exemplary embodiments described above, the three-axis magnetic sensor 11 and the acceleration sensor 12 are provided separately, the three-axis magnetic sensor 11 and the acceleration sensor 12 may be constituted by the same components, that is, may be integrally packaged.

What is claimed is:

1. An electronic timepiece comprising:
a case;
at least one of a dial or a display unit housed in the case and including a display surface;
a three-axis magnetic sensor housed in the case and including a first detection axis and a second detection axis, which are disposed in a plane parallel with the display surface and orthogonal to each other, and a third detection axis orthogonal to the plane;
an inclination sensor housed in the case and configured to detect an inclination of the case; and
a processor housed in the case and configured to execute first calibration processing of performing a calibration in two axial directions of a direction along the first detection axis and a direction along the second detection axis, and second calibration processing of performing a calibration in a direction along the third detection axis, the second calibration processing being executed after the first calibration processing, wherein
the processor is configured to
set a measurement mode to a first measurement mode when the second calibration processing is not completed after completion of the first calibration processing, and set the measurement mode to a second measurement mode when the second calibration processing is completed,
execute, when the first measurement mode is set, first azimuth calculation processing of calculating an azimuth based on detected values of the three-axis magnetic sensor in the two axial directions, and
execute, when the second measurement mode is set, second azimuth calculation processing of calculating an azimuth based on detected values of the three-axis magnetic sensor in three axial directions of the direction along the first detection axis, the direction along the second detection axis, and the direction along the third detection axis, and a detected value of the inclination sensor, and
the first azimuth calculation processing to calculate the azimuth is not the same as the second azimuth calculation processing to calculate the azimuth.

2. The electronic timepiece according to claim 1, comprising a mode display unit configured to display the measurement mode set by the processor.

3. The electronic timepiece according to claim 2, wherein the processor uses the inclination sensor to execute the first azimuth calculation processing, and includes a notification unit configured to provide notification when output data from the inclination sensor exceed a threshold value related to inclination in the first azimuth calculation processing.

4. The electronic timepiece according to claim 2, comprising a hand configured to indicate an azimuth calculated by the processor.

5. The electronic timepiece according to claim 1, wherein the processor uses the inclination sensor to execute the first azimuth calculation processing, and includes a notification unit configured to provide notification when output data from the inclination sensor exceed a threshold value related to inclination in the first azimuth calculation processing.

6. The electronic timepiece according to claim 5, comprising a hand configured to indicate an azimuth calculated by the processor.

7. The electronic timepiece according to claim 1, comprising a hand configured to indicate an azimuth calculated by the processor.

8. The electronic timepiece according to claim 1, wherein the processor is configured to execute, when the first measurement mode is set, the first azimuth calculation processing of calculating the azimuth based on the detected values of the three-axis magnetic sensor in the two axial directions, and without using a detected value of the three-axis magnetic sensor in the direction along the third detection axis and a detected value of the inclination sensor.

* * * * *